(12) United States Patent
Hirotsu et al.

(10) Patent No.: US 11,827,234 B2
(45) Date of Patent: Nov. 28, 2023

(54) DRIVING CONTROL SYSTEM

(71) Applicant: Hitachi Astemo, Ltd., Hitachinaka (JP)

(72) Inventors: Teppei Hirotsu, Tokyo (JP); Nobuyasu Kanekawa, Tokyo (JP); Atsushi Arata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 170 days.

(21) Appl. No.: 17/420,045

(22) PCT Filed: Dec. 19, 2019

(86) PCT No.: PCT/JP2019/049744
§ 371 (c)(1),
(2) Date: Jun. 30, 2021

(87) PCT Pub. No.: WO2020/149090
PCT Pub. Date: Jul. 23, 2020

(65) Prior Publication Data
US 2022/0080987 A1   Mar. 17, 2022

(30) Foreign Application Priority Data
Jan. 17, 2019 (JP) ................................. 2019-005662

(51) Int. Cl.
*B60W 60/00*  (2020.01)
*B60W 50/02*  (2012.01)
*B60W 50/023* (2012.01)

(52) U.S. Cl.
CPC ...... *B60W 50/0205* (2013.01); *B60W 50/023* (2013.01); *B60W 60/001* (2020.02); *B60W 2050/021* (2013.01)

(58) Field of Classification Search
CPC .......... B60W 50/0205; B60W 50/023; B60W 60/001; B60W 2050/021
See application file for complete search history.

(56) References Cited

U.S. PATENT DOCUMENTS 11,492,009 B2 * 11/2022 Kawakami ......... G01C 21/3691
2018/0170374 A1   6/2018 Otsuka et al.
(Continued)

FOREIGN PATENT DOCUMENTS

| JP | 2017-47694 A | 3/2017 |
| JP | 2017-81290 A | 5/2017 |

(Continued)

OTHER PUBLICATIONS

Japanese-language Office Action issued in Japanese Application No. 2019-005662 dated Dec. 13, 2022 with English translation (eight (8) pages).

(Continued)

*Primary Examiner* — Ian Jen
(74) *Attorney, Agent, or Firm* — Crowell & Moring LLP (57) ABSTRACT

Provided is a device that prevents a vehicle behavior from being unstable when an operation is continued using a degeneration function at a time of failure of a drive unit command value generation function in an autonomous driving system. A future actuator command value outputted by a main function unit for generating a drive unit command value and a simple actuator command value outputted by the degeneration function of generating a drive unit command value are synthesized using a weighting factor that changes with time.

9 Claims, 6 Drawing Sheets

(56) References Cited

U.S. PATENT DOCUMENTS

| | | |
|---|---|---|
| 2018/0257662 A1 | 9/2018 | Ishigooka et al. |
| 2019/0031202 A1* | 1/2019 | Takeda ................ B60T 8/17557 |
| 2020/0023854 A1 | 1/2020 | Horiguchi et al. |
| 2020/0290641 A1 | 9/2020 | Kawakami |

FOREIGN PATENT DOCUMENTS

| | | |
|---|---|---|
| JP | 2017-157067 A | 9/2017 |
| JP | 2017-196965 A | 11/2017 |
| JP | 2018-158697 A | 10/2018 |
| WO | WO 2017/138517 A1 | 8/2017 |
| WO | WO 2018/225225 A1 | 12/2018 |

OTHER PUBLICATIONS

International Search Report (PCT/ISA/210) issued in PCT Application No. PCT/JP2019/049744 dated Mar. 17, 2020 with English translation (five (5) pages).
Japanese-language Written Opinion (PCT/ISA/237) issued in PCT Application No. PCT/JP2019/049744 dated Mar. 17, 2020 (five (5) pages).

* cited by examiner

| t[s] | ACCELERATION [m/s/s] | ANGULAR VELOCITY [deg/s] |
|---|---|---|
| 0.1 | 0 | 0.1 |
| 0.2 | 0 | 0.1 |
| 0.3 | 0 | 0 |
| 0.4 | 0 | 0 |
| 0.5 | 0.1 | -0.1 |
| 0.6 | 0.5 | -0.1 |
| ⋮ | ⋮ | ⋮ |

DRIVING CONTROL SYSTEM

TECHNICAL FIELD

The present invention relates to a driving control system for making a driving plan for an automobile, and relates to a driving control system including an upper calculator (hereinafter, referred to as an "autonomous driving controller") configured to make a driving plan and a lower calculator (hereinafter, referred to as a "drive unit command generator") configured to control devices that control a motion of a vehicle, such as an engine, a transmission, a brake, and a steering, under the upper calculator. In particular, the driving control system includes means for continuing motion control of the vehicle when a failure occurs in the drive unit command generator.

BACKGROUND ART

[Advancement of Autonomous Driving and Request for Fail Operation]

In recent years, with the development of the artificial intelligence technology, practical application of an autonomous driving control technology for automobiles has been promoted. In advanced autonomous driving, a system is responsible for vehicle control, and therefore high safety is required. As one of the requirements for this safety, there is a request for a fail operation.

The fail operation refers to a function of maintaining minimum performance when a part of components fails by using a remaining function instead of immediately stopping the function. In driving control, for example, even when a failure occurs, safety can be ensured by enabling the vehicle to move to a safe place and then stop as compared with a case where the vehicle immediately stops at the site.

[Known Art Related to Fail Operation]

As a known art for achieving such a fail operation, there is known a driving control system as disclosed in PTL 1. PTL 1 discloses a driving control system including a plurality of calculators that calculates command values to a drive unit command generator in an autonomous driving controller to be redundant, in which a fail operation of autonomous driving control can be achieved.

CITATION LIST

Patent Literature

PTL 1: JP 2017-047694 A

SUMMARY OF INVENTION

Technical Problem

Although the known art is effective for the fail operation of the autonomous driving controller, there is no disclosure of means for achieving the fail operation of the drive unit command generator as a lower system. It is desirable and necessary to support the fail operation of the drive unit command generator.

Solution to Problem

In order to solve such a problem, a driving control system of the present invention is a drive unit command generator connected between an autonomous driving controller that calculates a vehicle behavior of an autonomous driving vehicle on the basis of an external recognition result from a recognizer and a plurality of drive units that controls actuators such as an engine, a motor, and a steering, in which the drive unit command generator receives vehicle behavior command values of at least two systems from the autonomous driving controller and then sends different actuator command values of at least two systems (a command value from a first calculator and a command value from a second calculator) to each of the drive units.

Advantageous Effects of Invention

The present invention enables the autonomous driving control to be continued when a failure occurs in the drive unit command generator.

DESCRIPTION OF EMBODIMENTS

Hereinafter, an embodiment of the present invention will be described with reference to the drawings.

First Embodiment

[Overall Configuration]

Hereinafter, a configuration and an operation of a driving control system according to a first embodiment of the present invention will be described with reference to FIG. 1.

Figure 1:
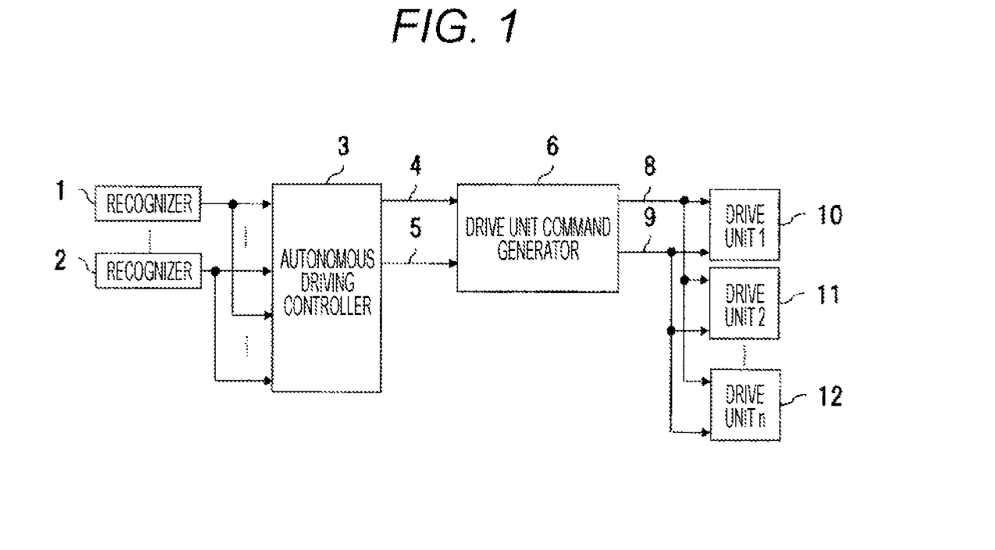
FIG. 1 is an overall block diagram of a driving control system.

FIG. 1 is an overall block diagram of the driving control system according to this embodiment, which generally includes recognizers (1 and 2) such as a camera and a radar, an autonomous driving controller 3, a drive unit command generator 6, and drive units (10 to 12) such as an engine, a brake, and a steering.

On the basis of information on surrounding environment acquired by the recognizers (1 to 2), the autonomous driving controller 3 calculates a vehicle behavior command value that avoids a collision with a dynamic object and provides comfortable riding, and outputs the vehicle behavior command value to the drive unit command generator 6 on a lower side by using communication paths of two systems (4 to 5). The drive unit command generator 6 calculates an actuator command value for implementing the inputted vehicle behavior command, and outputs the drive units (10 to 12) using the communication paths of two systems (8 to 9). The drive units (10 to 12) control actuators such as an engine, a transmission, and a brake (not illustrated in the drawings) in accordance with the inputted actuator command value.

Figure 2:
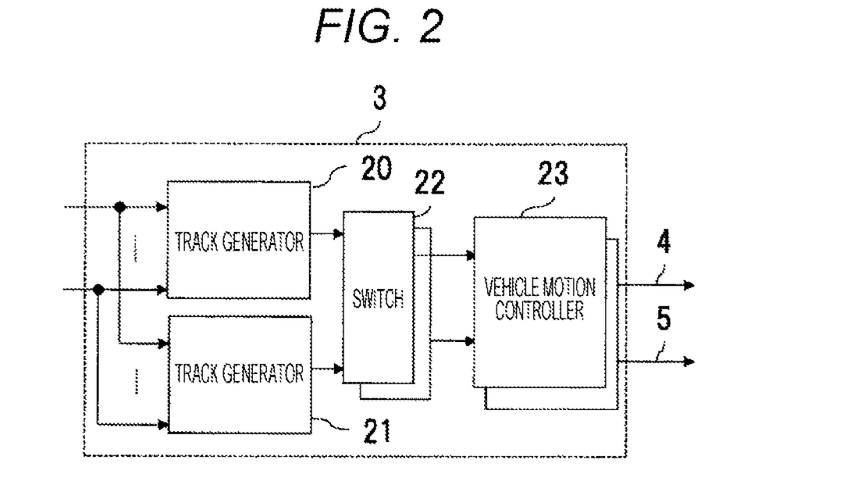
FIG. 2 is a block diagram of an autonomous driving controller 3.

FIG. 2 is a block diagram of the autonomous driving controller 3.

The autonomous driving controller 3 includes a track generator 20, a track generator 21, a switch 22, and a vehicle motion controller 23.

Figure 4:
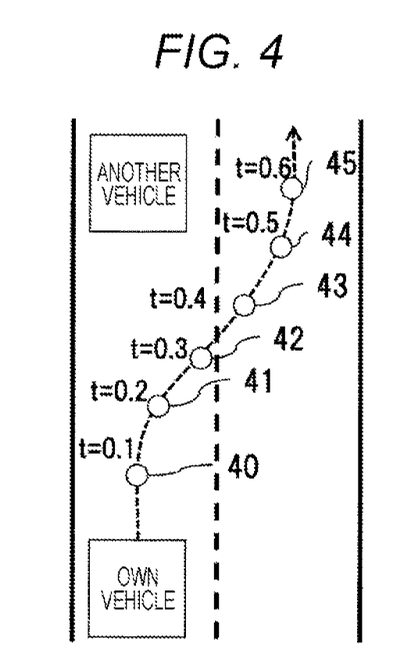
FIG. 4 is an example of a vehicle track for going past a vehicle in front.

The track generator 20 and the track generator 21 generate a vehicle track that avoids collision with a dynamic object and provides comfortable riding on the basis of the information on surrounding environment acquired by the recognizers (1 to 2). FIG. 4 illustrates an example of a vehicle track for going past a vehicle in front. In this example, a future vehicle position is set in 0.1 second increments.

When either the track generator 20 or the track generator 21 fails, the switch 22 selects a vehicle track outputted by a normal track generator and outputs the selected vehicle track to the vehicle motion controller 23.

Figure 5:
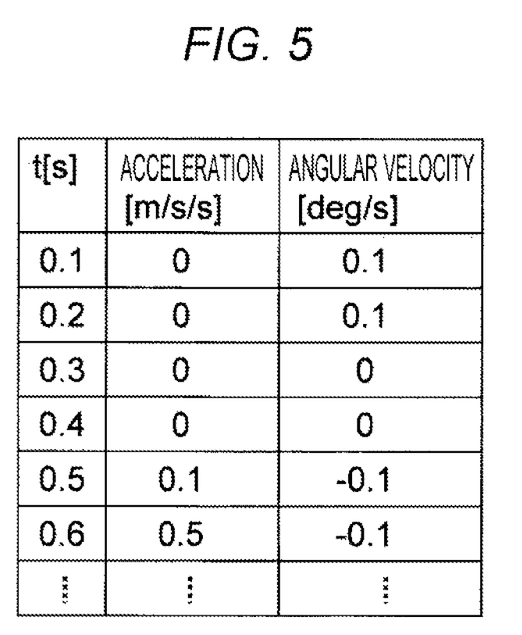
FIG. 5 illustrates an example of a vehicle behavior command value for following the vehicle track illustrated in FIG. 4.

The vehicle motion controller 23 generates a vehicle behavior command value for following the inputted vehicle track. FIG. 5 is an example of a vehicle behavior command value for following the vehicle track illustrated in FIG. 4, and future acceleration and angular velocity command are set in units of 0.1 seconds.

The switch 22 and the vehicle motion controller 23 are implemented by using two sets of computing units of a lock step in order to achieve the fail operation. Note that, in order to achieve the fail operation of the switch 22 and the vehicle motion controller 23, the switch 22 and the vehicle motion controller 23 do not have to be implemented by the computing units of the lock step, but may be achieved by another implementation method such as use of majority decision.

Figure 3:
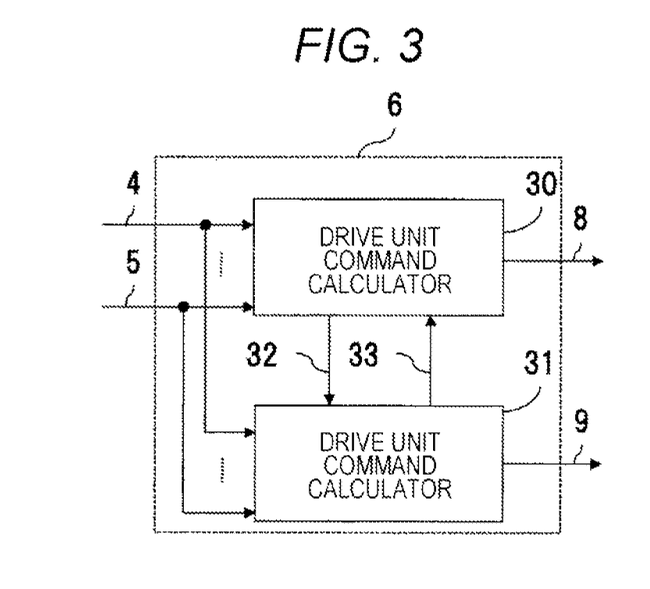
FIG. 3 is a block diagram of a drive unit command value generator 6.

FIG. 3 is a block diagram of the drive unit command value generator 6.

The drive unit command value generator 6 includes a drive unit command calculator 30 and a drive unit command calculator 31. The drive unit command calculator 30 is a main function for generating an actuator command value. When the drive unit command calculator 30 fails, the drive unit command calculator 31 becomes a degenerate system and achieves the fail operation.

The drive unit command calculator 30 selects a normal vehicle behavior command value from the vehicle behavior command values of two systems inputted from the autonomous driving controller 5, calculates an actuator command value for implementing the vehicle track command, and outputs the actuator command value to the drive units (10 to 12) via a communication path 8.

A method in which the drive unit command calculator 30 calculates an actuator command value will be described with reference to FIGS. 6 and 7.

Figure 6:
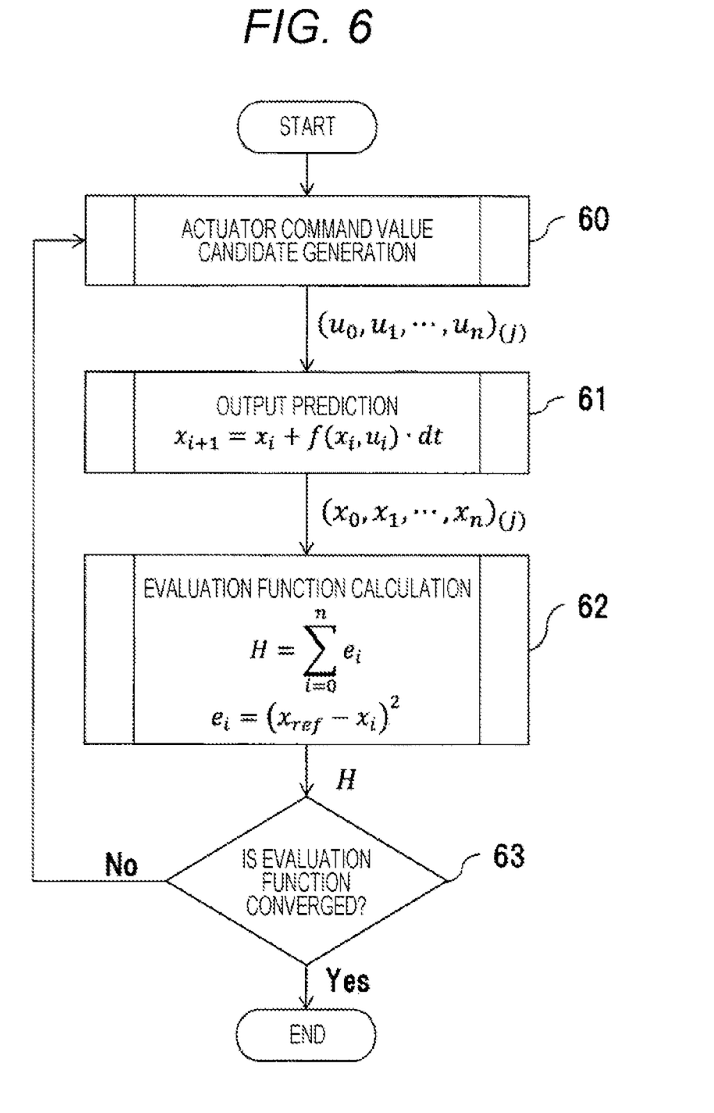
FIG. 6 is a flowchart in which a drive unit command calculator 30 calculates an actuator command value.

FIG. 6 is a flowchart in which the drive unit command calculator 30 calculates an actuator command value. This flowchart includes an actuator command value candidate generation step 60, an output prediction step (61), an evaluation function calculation step (62), and an evaluation function convergence determination step (63).

The actuator command value candidate generation step 60 generates a future actuator command value candidate (u0, u1, ..., un) (j), where a subscript u indicates the number of steps in a time direction (un: actuator command value after n steps), and a subscript j outside parentheses indicates the number of searches. The actuator command value candidate is generated by using a search solving method for an optimization problem, such as a genetic algorithm or the artificial bee colony algorithm.

In the output prediction step 61, an output of the actuator (x0, x1, ..., xn) (j) when a future actuator command value candidate (u0, u1, ..., un) (j) is inputted is calculated by a difference equation based on a physical model of the actuator. Note that a subscript x indicates the number of steps in the time direction (xn: actuator output after n steps), and the subscript j outside the parentheses indicates the number of searches.

The evaluation function calculation step 62 evaluates how much the actuator output calculated in the output prediction step 61 satisfies a desired control objective. FIG. 6 illustrates an example of an evaluation function for causing the actuator output to follow xref.

The evaluation function convergence determination step 63 determines whether the value of the evaluation function is equal to or less than a predetermined threshold. When the condition is satisfied, the processing ends. When the condition is not satisfied, the processing returns to the actuator command value candidate generation step 60, and the processing is repeated.

Figure 7:
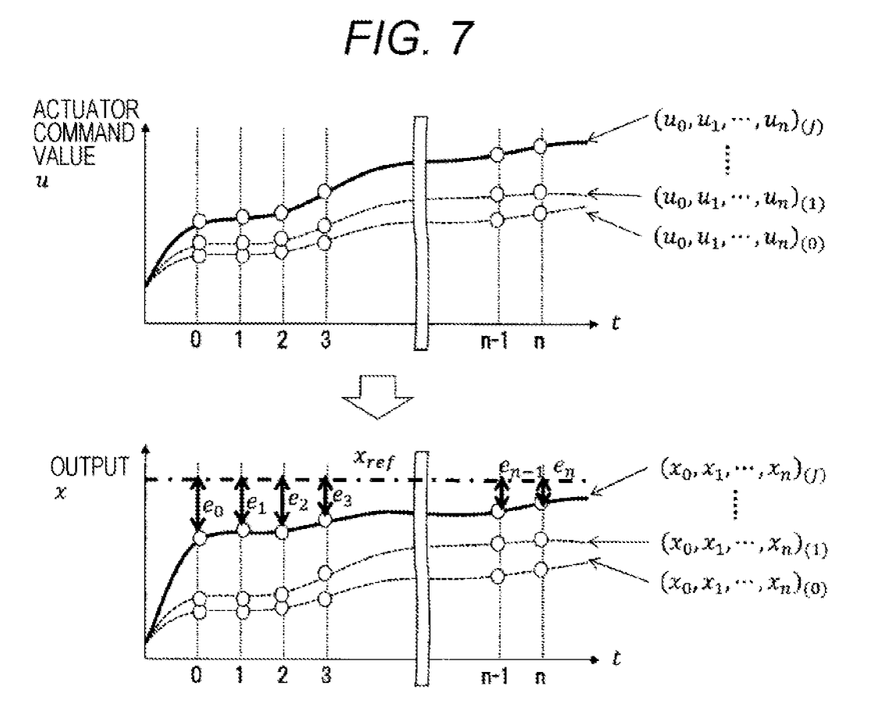
FIG. 7 is an operation diagram of the flowchart described with reference to FIG. 6.

FIG. 7 illustrates an operation of the flowchart described in FIG. 6.

In the actuator command value candidate generation step 60, an initial value (u0, u1, ..., un) (0) of the actuator command value candidate is generated. In the following output prediction step 61, the actuator output (x0, x1, ..., xn) (0) when (u0, u1, ..., un) (0) is inputted is calculated. The evaluation function is calculated in the subsequent evaluation function calculation step 62, and the evaluation function convergence determination step 63 determines whether the value of the evaluation function is equal to or less than a predetermined threshold. Since the condition is not satisfied, the processing returns to the actuator command value candidate generation step 60, and the processing is repeated. Finally, the evaluation function becomes equal to or less than the threshold value at the number of iterations of J−1, and the processing ends. Through the above processing, it is possible to calculate an optimum actuator operation amount that matches the control objective represented by the evaluation function. The drive unit command calculator 30 outputs only u0 of the actuator command values (u0, u1, ..., un) (J) at the end of the calculation via the communication path 8, and outputs the entire actuator command value (u0, u1, ..., un) (J) to the drive unit command calculator using the communication path 32.

The drive unit command calculator 31 selects a normal vehicle behavior command value from the vehicle behavior command values of two systems inputted from the autonomous driving controller 5, calculates an actuator command value for implementing the vehicle track command, and outputs the actuator command value to the drive units (10 to 12) via a communication path 9.

Figure 10:
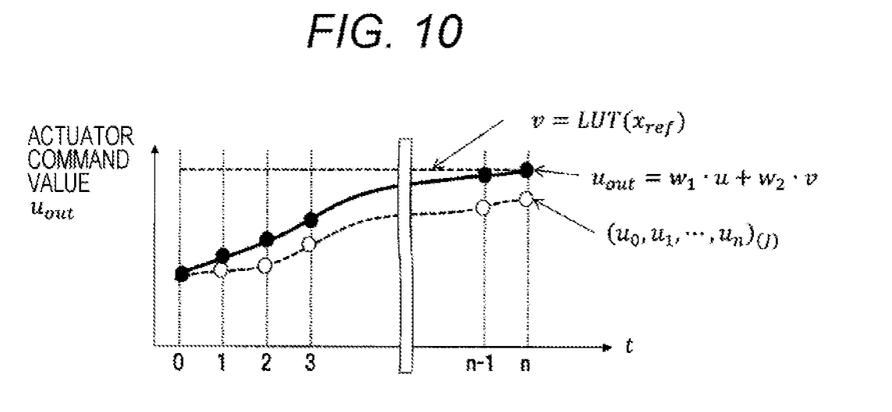
FIG. 10 illustrates an output example of an actuator command value Uout i calculated by a drive unit command calculator 31.

A method in which the drive unit command calculator 31 calculates an actuator command value will be described with reference to FIGS. 8 and 10.

Figure 8:
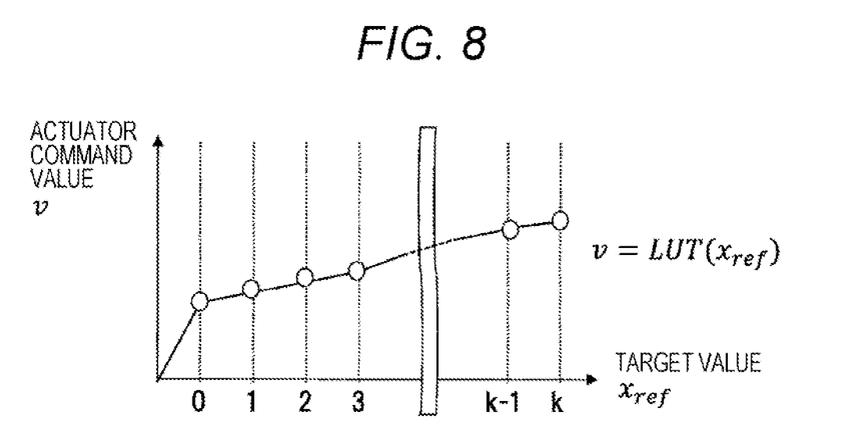
FIG. 8 illustrates a method of generating an actuator command value v using a lookup table.

FIG. 8 illustrates a method of generating an actuator command value v using a lookup table. Representative points of k+1 of the actuator command value corresponding to a target value of the actuator output are set, and interpolation is performed between the representative points.

The drive unit command calculator 31 uses the actuator command value (u0, u1, ..., un) (J) inputted from the drive unit command calculator 31 and the actuator command value v using the lookup table to calculate an actuator command value by the following Equation 1.

Figure 9:
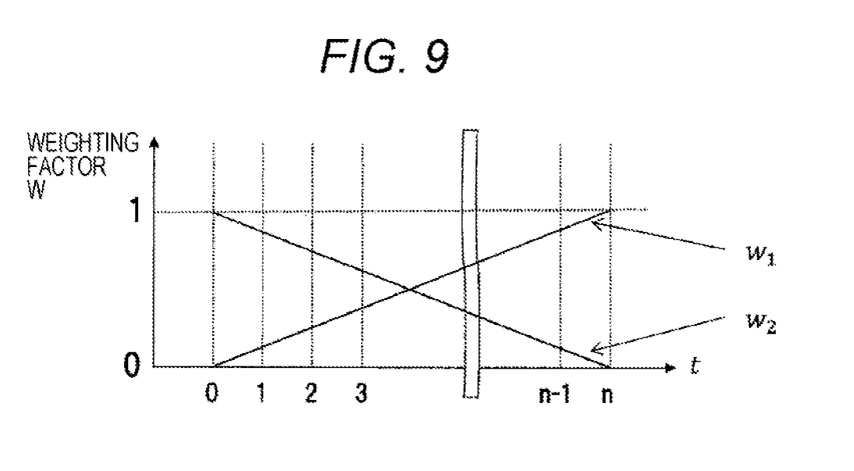
FIG. 9 illustrates temporal changes of weighting factors.

Uout_i=w1_$i$*v+w2*$u\_i$ (Equation 1) (subscript "_i" indicates a time step) where w1_$i$ and w2_$i$ are weighting factors having a value of 0 to 1 and change as illustrated in FIG. 9.

FIG. 1 illustrates an output example of the actuator command value Uout_i calculated by the drive unit command calculator 31.

The drive unit command calculator 31 synthesizes the actuator command value (u0, u1, ... , un) (J) inputted from the drive unit command calculator 31 by using the weighting factor that changes with time. When the drive unit command calculator 30 fails, it is possible to continuously switch to the actuator command value using the lookup table as a simple calculation. This can securely stable the vehicle behavior at the time of the fail operation.

The drive unit command generator according to this embodiment and the vehicle control system including the drive unit command generator transmit, to the drive units, different actuator command values of at least two systems including a first actuator command value generated by the drive unit command calculator 30 as a first calculator and a second actuator command value generated by the drive unit command calculator 31 as a second calculator. As a result, when the drive unit command calculator 30 fails, the drive units can be driven by the command value generated by the drive unit command calculator 31, and the fail operation can be achieved.

The drive unit command calculator 30 desirably performs calculation including a command value after a certain period of time (in the future) since this calculation improves riding comfort. However, in a case where the calculation is performed including a command value after a certain period of time, the calculation scale becomes large. Thus, if the drive unit command calculator 31 performs similar calculation, system costs increase. Therefore, as a further preferable example, the drive unit command 31 can achieve the fail operation and also suppress an increase in the system costs by using a simple calculation such as a method using a lookup table.

As a further preferable example, a calculation result after a certain period of time generated by the drive unit command calculator 30 is transmitted to the drive unit command 31. When the drive unit command calculator 30 fails, the drive unit command 31 calculates an actuator command value on the basis of the result of calculation after a certain period of time, the calculation being performed by the drive unit command calculator 30 before the failure. The drive unit command calculator 30 and the drive unit command calculator 31 use different calculation methods, and thus a driver may feel uncomfortable due to discontinuity caused by sudden switching. However, the drive unit command calculator 31 performs calculation using the calculation result generated by the drive unit command calculator 30 at a time of succeeding from the drive unit command calculator 30 to alleviate the discontinuity and allow smooth succession at the time of the fail operation. The drive unit command calculator 31 continues the calculation on the basis of the command value from the autonomous driving controller after a lapse of a certain period of time.

As a further preferable example, vehicle control command values of at least two systems are received from the autonomous driving controller. The drive unit command generator 6 is configured to receive vehicle control command values 4 and 5 of at least two systems from the autonomous driving controller 3, and thus, for example, even if one communication line is disconnected, control can be continued. Note that the signals of two systems may be redundant systems, or one of the signals may be a normal command value and the other signal may be a degenerate track such as a track for retracting to a safety zone or a track for securing time for succeeding to the driver. In the latter case, the autonomous driving controller does not have to be a complete redundant system, which can reduce the system costs.

The drive unit (drive control device) preferably has a function of selecting one of the command value calculated by the drive unit command calculator 30 or the command value calculated by the drive unit command calculator 31.

REFERENCE SIGNS LIST 1, 2 recognizer
3 autonomous driving controller route planning unit
6 drive unit command value generator
10 to 12 drive unit

The invention claimed is:

1. A drive unit command generator configured to receive a signal from an autonomous driving controller that calculates a vehicle behavior of an autonomous vehicle and output the signal to drive units that control an actuator, the drive unit command generator comprising
a first calculator and a second calculator, wherein
the first calculator performs calculation including an actuator command value after a certain period of time, and sends the actuator command value after the certain period of time to the second calculator;
the second calculator generates an actuator command value using a lookup table: and
when the first calculator fails, the second calculator synthesizes the actuator command value after the certain period of time obtained by performing calculation using the first calculator before a failure with the actuator command value generated using the lookup table by using the weighting factor that changes with time and sends an actuator command value to each of the drive units.

2. The drive unit command generator according to claim 1, wherein an equation is used for the synthesis:

$$U=w1*v+w2*u$$

wherein,
U is the actuator command value that is sent to the drive units
u is the actuator command value calculated by the first calculator,
v is the actuator command value generated by the second calculator using the lookup table,
w1 is a weighting factor that increases with a temporal change, and
w2 is a weighting factor that decreases with a temporal change.

3. The drive unit command generator according to claim 2,
wherein the first calculator sends the actuator command value after the certain period of time to the second calculator.

4. The drive unit command generator according to claim 3, wherein the second calculator calculates the actuator command value for a certain period of time based on a calculation result after the certain period of time obtained by performing calculation using the first calculator before a failure.

5. The drive unit command generator according to claim 1, wherein the drive unit command generator receives vehicle behavior command values of at least two systems from the autonomous driving controller.

6. A vehicle control system comprising:
a plurality of surrounding environment recognizers;
a plurality of actuators;
a plurality of actuator controllers corresponding to the plurality of actuators;
an autonomous driving controller configured to calculate a vehicle behavior based on input values from the plurality of surrounding environment recognizers; and
a drive command generator configured to calculate an actuator command value to the plurality of actuator controllers based on an input value from the autonomous driving controller,
wherein the drive command generator has a first calculator and a second calculator;
the first calculator performs calculation including an actuator command value after a certain period of time, and sends the actuator command value after the certain period of time to the second calculator;
the second calculator generates an actuator command value using a lookup table; and
when the first calculator fails, the second calculator sends, to the plurality of actuator controllers, an actuator command value that is obtained by synthesis of the actuator command value after the certain period of time obtained by performing calculation using the first calculator before a failure with the actuator command value generated using the lookup table by using the weighting factor that changes with time.

7. The vehicle control system according to claim 6, wherein a first actuator command value of the different actuator command values of two systems is calculated by a first calculation method of performing calculation including an actuator command value after a certain period of time.

8. The vehicle control system according to claim 7, wherein, in a second calculation method of calculating a second actuator command value of the different actuator command values of two systems, calculation at a time of failure of the first calculation method is performed based on a calculation result after a certain period of time obtained at a normal state by the first calculation method of calculating the first actuator command value.

9. The vehicle control system according to claim 8, wherein the autonomous driving controller transmits signals of at least two systems to the drive command generator.

* * * * *